United States Patent Office 2,835,590
Patented May 20, 1958

2,835,590

PROCESS OF PRODUCING AN ARTIFICIAL CHOCOLATE FLAVOR AND THE RESULTING PRODUCT

Irving I. Rusoff, Newark, N. J., assignor to General Foods Corporation, White Plains, N. Y., a corporation of Delaware No Drawing. Application September 21, 1954
Serial No. 457,550

12 Claims. (Cl. 99—140)

This invention relates to an artificial chocolate flavor and to a process for making the same.

Heretofore, the development of chocolate flavor from cacao has involved numerous widely separated steps in which cacao beans are removed from their pods and subjected to well known processes which include fermentation, drying, grading and roasting. Many of these steps occur in the tropics, whereas others take place months later at the chocolate manufacturers' plants. Moreover, the skill with which the cacao is processed in these steps varies although in all of such steps a high degree of control must be exercised if a final product of high quality is to be obtained. As a result, the cost of chocolate, cocoa and other sources of chocolate flavor has become excessive. Then again, there is difficulty with control of the processing steps because of variations in the cacao itself. These and other considerations contribute to a complex marketing situation.

The invention has for its primary object the elimination of reliance on cacao as the source of chocolate flavor by development of such flavor from other raw materials.

It has now been discovered that an imitation or artificial chocolate flavor can be produced by reacting a reducing saccharide or precursor thereof with a member of a group consisting of glycyl and alanyl peptides. By "glycyl and alanyl peptides" is meant those peptides wherein the amino end of the peptide molecule is $NH_2CH_2CO-$ or $NH_2CH(CH_3)CO-$, i. e., the non-hydroxylic residue of the amino acids glycine or alanine, respectively. These peptides may be provided either by protein degradation such as by enzyme, acid or alkaline hydrolysis as well as by well known synthetic techniques. Reaction between the peptide and the reducing saccharide may be carried out at temperatures substantially between 90°–170° C., the particular temperature employed varying with the reactivity between the peptide and the saccharide.

The peptide reactant employed may be any glycyl or alanyl peptide ranging in molecular complexity from di- and tripeptides to tetra-, penta-, and hexapeptides. Among the peptides which can be used in the present invention are:

Glycyl-glycine
Diglycyl-glycine
Triglycyl-glycine
Tetraglycyl-glycine
Pentaglycyl-glycine
Glycyl-alanine
Glycyl-alanyl-glycine
Glycyl-dialanyl-glycine
Glycyl-alanyl-leucine
Glycyl-alanyl-leucyl-isoleucine
Glycyl-α-amino-n-butyric acid
Glycyl-valine
Glycyl-leucine
Diglycyl-leucine
Triglycyl-leucyl-glycine
Diglycyl-alanyl-glycine
Diglycyl-leucyl-glycine
Glycyl-isoleucine
Glycyl-leucyl-glycine
Glycyl-leucyl-glycyl-leucine
Glycyl-leucyl-alanine
Glycyl-leucyl-leucine
Glycyl-dileucyl-leucine
Glycyl-trileucyl-leucine
Glycyl-asparagine
Glycyl-alanyl-glutamic acid
Glycyl-glutamic acid
Glycyl-glutamine
Glycyl-glutaminyl-glycine
Glycyl-phenylalanine
Glycyl-phenylalanyl-glutamic acid
Glycyl-tyrosine
Diglycyl-tyrosine
Glycyl-alanyl-glycyl-tyrosine
Glycyl-alanyl-tyrosine
Glycyl-tyrosyl-glycine
Glycyl-cysteine
Glycyl-serine
Glycyl-histidine
Glycyl-proline
Diglycyl-proline
Glycyl-prolyl-glycine
Diglycyl-hydroxyproline
Glycyl-hydroxyproline
Glycyl-tryptophan
Glycyl-methionine
Alanyl-glycine
Alanyl-glycyl-glycine
Alanyl-diglycyl-glycine
Alanyl-diglycyl-alanyl-glycyl-glycine
Alanyl-glycyl-alanine
Alanyl-glycyl-leucine
Alanyl-alanine
Dialanyl-alanine
Trialanyl-alanine
Tetraalanyl-alanine
Dialanyl-glycine
Alanyl-α-amino-n-butyric acid
Alanyl-valine
Alanyl-leucine
Alanyl-leucyl-glycine
Alanyl-leucyl-valine
Alanyl-leucyl-leucine
Alanyl-leucyl-isoleucine
Alanyl-isoleucine
Alanyl-α-amino-isobutyric acid
Alanyl-glutamine
Alanyl-phenylalanine
Alanyl-tyrosine
Alanyl-glycyl-tyrosine
Alanyl-tryptophan
Alanyl-methionine
Alanyl-histidine
Alanyl-asparagine
Alanyl-norvaline Generally, the flavor product resulting is substantially enhanced through the addition of one or more amino acids, e. g., α-amino-n-butyric acid, alanine, arginine, aspartic acid, glycine, glutamic acid, histidine, valine, phenylalanine, proline, isoleucine, leucine, threonine, tyrosine and tryptophan. Thus, in the presence of such amino acids artificial chocolate flavors from peptides such as glycyl-alanine, glycyl-α-amino-n-butyric acid, glycyl-valine, glycyl asparagine, alanyl-α-amino-n-butyric acid, alanyl-valine, glycyl-leucine, glycyl-tyrosine, alanyl-asparagine and alanyl-methionine were enhanced.

The desired peptide may be reacted with any suitable reducing saccharide, i. e., a saccharide capable of reducing Fehling's solution to give cuprous oxide, or with any suitable precursor thereof which expression includes all saccharides and other materials that provide a reducing saccharide or saccharides under the conditions of the reaction. These precursor materials consist mainly of those di- and polysaccharides which undergo molecular cleavage to yield reducing saccharides, such as the disaccharide, sucrose; the trisaccharide, raffinose; the polysaccharide material, dextrin, which of itself comprises both reducing saccharides and precursors thereof; etc. The reducing saccharides include all monosaccharides, disaccharides of the gentiobiose type, the trisaccharide manniotriose, etc. In addition, certain saccharic materials can be used which are derived from or closely related to the monosaccharides and have similar reducing properties, such as the "-uronic" acid, galacturonic acid; the desoxy sugar, rhamnose; and the penta-acetate of galactose. Thus the term "reducing saccharide" as used in the claims will be understood to include all of the reducing saccharide and saccharic compounds and precursors which provide reducing saccharide or saccharic compounds under the conditions of the reaction by degradation of the molecule or in any other manner.

It has been found necessary that, in order to achieve the development of the artificial chocolate flavor, reaction must be carried out under such conditions as to effect a substantially anhydrous state of the reaction mixture at least in the later stages of the reaction. It is believed that the development of the chocolate flavor depends upon a high degree of molecular contact between the reactants and that, water, therefore, if used to facilitate intimate admixture of the reactants must be largely removed so as to provide the aforementioned substantially anhydrous condition. However, the term "substantially anhydrous" is not meant to exclude the presence of some water in the mixture. In fact, a small amount of water is formed continuously during the course of the reaction, which fact alone is sufficient to preclude a completely anhydrous state at the end of the reaction. No analytical methods are available which permit determining with accuracy the maximum amount of water permissible at the end of the reaction. Good results have been obtained when the end product at the reaction temperature contained sufficient moisture to render it more or less tacky in nature, and I believe that as much as 5–10% moisture may have been present in some of such cases. These figures cannot be determined definitely, however, and in practice it is satisfactory to observe the rule that the product upon cooling to room temperature is substantially solid and substantially dry to the touch. The term "substantially anhydrous" is to be understood to include the presence of moisture within this limitation.

The useful saccharide materials can be divided into the following groups according to the preferred temperature ranges of the reaction, although it will be understood that the stated limits of these preferred ranges are not necessarily the minimum or maximum temperatures at which some useful results can be secured.

(1) The pentoses, including aldopentoses, methyl pentoses, ketopentoses, etc. Examples are xylose, arabinose, and rhamnose. For this group, the preferred temperature range of the reaction is from 90° C. to about 130° C.

(2) The hexoses and reducing polysaccharides. In common with the pentoses of group 1, these reducing saccharides of group 2 have reactive aldehyde or ketone groups which are free to participate directly in the reaction with the peptides, but are less reactive than the pentoses so that the preferred temperature range for the reaction is approximately from 120° C. to 150° C. Examples are the aldohexoses such as glucose, galactose and mannose; the ketohexoses such as levulose and sorbose; reducing disaccharides such as lactose and maltose and other disaccharides of the gentiobiose type; the reducing trisaccharide manninotriose; etc. With this group may also be classified saccharide mixtures such as corn syrup and malt syrup which contain both dextrose and maltose, and invert sugar which contains dextrose and levulose. In addition such saccharic materials as galacturonic acid and the penta-acetate of galactose can be used in this temperature range.

(3) Non-reducing polysaccharides which are precursors of reducing saccharides, as explained above. In this group, the temperature must be high enough in the first place to cause the formation of the reducing saccharide, and the preferred temperature range is approximately 140° C. to 170° C. Examples are the polysaccharides sucrose, dextrin and raffinose.

Within these preferred ranges the times of reaction for any given saccharide varies inversely with the temperature of the reaction and also to some extent with different individual members of each group. In general the reaction time desirable to develop good flavor product in any of the above groups will not exceed about 2 hours at the low temperature end of the range for that group, and at the high temperature end of such range it may be reduced to a few minutes.

Supplemental flavoring principles may be employed with the artificial chocolate flavor to provide degrees of bitterness and/or astringency to the eventual artificial flavor, and thereby accent the somewhat fugitive character of chocolate flavor. Significantly, it has been found that these bitterness and astringency principles provide substantially the same flavor level whether added before or after reacting the peptide and reducing saccharide and, accordingly, it may be presumed that the supplemental agents do not enter into the flavor-producing reaction. Bitterness may be provided by the addition of alkaloids such as theobromine or caffein in various levels to suit personal taste. Other bitterness principles have been successfully employed such as naringin and, indeed, the latter accents chocolate character to a higher degree than equal amounts of theobromine and caffein. Likewise, astringency can be imparted to the product by employing tannins such as quebracho or chestnut tannins at a level of around 10% by weight of the flavor product. Also, various tannate complexes may be successfully employed such as the theotannates derived from tea and the like.

The artificial chocolate flavor product resulting from the process of the invention is a powdery, friable material which is soluble in aqueous media such as water, milk, and the like. The product is capable of being employed either as a substitute for natural chocolate flavor or as a fortifier or extender of natural chocolate flavor. The flavor can be incorporated into a wide variety of products such as confectionery products, dairy products, bakery goods, and various other food products. It may also be combined with fats such as cocoa butter or various hydrogenated or fractionated vegetable fats to provide an artificial chocolate or artificial chocolate coating.

The process of the present invention is illustrated by reacting the peptides listed in the following table with the reducing saccharide dextrose. The reaction was carried out both in the absence and presence of the amino acids such as those aforementioned. The resultant artificial chocolate products were evaluated flavorwise, optimal flavor scores being denoted as "high," intermediate scores as "good" and lower scores as "fair" in the following table. Specifically, a given peptide was admixed with dextrose in the ratio of 5 parts by weight of peptide to 1 part by weight of dextrose, sufficient water was added to provide substantial solution and/or dispersion of the reactants. Generally, an amount of water equal to about 30% by weight of the reactants was adequate for this purpose and provided a reaction mixture having a pasty consistency. The reaction mixture was then heated for 8 minutes at a temperature of 130° C. using an oil bath. The resulting flavor product was brown in color, friable and water soluble. It was evaluated flavor-wise by addition to milk containing sugar and 0.075% caffein, the latter serving as the aforementioned bitterness principle. It is also possible to heat the reaction mixture at a temperature below 90° C. to remove substantially all the water and then develop the artificial chocolate flavor by heating the mixture at an elevated temperature such as 130° C. for a period of, say, 2 minutes.

| Peptide | Flavor Score | |
|---|---|---|
| | Peptide Reacted Alone | With Amino Acid |
| glycyl-glycine | good | good |
| glycyl-alanine | good | high |
| glycyl-α-amino-n-butyric acid | fair | high |
| glycyl-valine | good | high |
| glycyl-leucine | fair | good |
| glycyl-phenylalanine | good | good |
| glycyl-tyrosine | fair | good |
| glycyl-tryptophan | good | good |
| glycyl-glycyl-glycine | good | good |
| glycyl-asparagine | | high |
| glycyl-proline | good | good |
| glycyl-serine | good | good |
| alanyl-glycine | good | good |
| alanyl-alanine | good | good |
| alanyl-α-amino-n-butyric acid | fair | high |
| alanyl-valine | good | high |
| alanyl-leucine | good | good |
| alanyl-isoleucine | good | good |
| alanyl-phenylalanine | good | fair |
| alanyl-methionine | fair | good |
| alanyl-glycyl-glycine | good | good |
| alanyl-asparagine | fair | good |
| alanyl-norvaline | fair | fair |

While the present invention has been described with reference to certain specific examples, it is not to be restricted thereby but reference should be had to the appended claims for a definition of the scope and limits of the invention.

What is claimed is:

1. A process for producing an artificial chocolate flavor which comprises reacting a saccharide with a member of the group consisting of glycyl and alanyl peptides ranging in molecular complexity from di- to hexa-peptides, the reaction mixture being in a substantially anhydrous state before the end of the reaction and the reaction being carried out at a temperature within the range of 90°–130° C. where the saccharide is a pentose; 120°–150° C. where the saccharide is selected from the group of hexoses and reducing polysaccharides; and 140°–170° C. where the saccharide is a non-reducing polysaccharide which is a precursor of a reducing saccharide.

2. The process of claim 1 in which the artificial chocolate flavor is developed by reacting the peptide with the reducing saccharide in the presence of an amino acid.

3. The artificial chocolate flavor produced according to the process of claim 1.

4. The artificial chocolate flavor produced according to the process of claim 2.

5. A process for producing an artificial chocolate flavor which comprises reacting a pentose with a member of the group consisting of glycyl and alanyl peptides ranging in molecular complexity from di- to hexa-peptides, the reaction being carried out at a temperature within the range of about 90°–130° C. and the reaction mixture being in a substantially anhydrous state before the end of the reaction.

6. A process for producing an artificial chocolate flavor which comprises reacting a reducing saccharide selected from the group consisting of hexoses and reducing poly-saccharides with a member of the group consisting of glycyl and alanyl peptides ranging in molecular complexity from di- to hexa-peptides, the reaction being carried out at a temperature within the range of about 120°–150° C. and the reaction mixture being in a substantially anhydrous state before the end of the reaction.

7. A process for producing an artificial chocolate flavor which comprises reacting a non-reducing polysaccharide with a member of the group consisting of glycyl and alanyl peptides ranging in molecular complexity from di- to hexa-peptides, the reaction being carried out at a temperature within the range of about 140°–170° C. and the reaction mixture being in a substantially anhydrous state before the end of the reaction.

8. A process for producing an artificial chocolate flavor which comprises reacting a saccharide with glycylglycine by the application of heat to a mixture of the reagents at an elevated temperature and for a time sufficient to produce said artificial chocolate flavor in a substantially anhydrous condition, said flavor producing reaction being carried out at a temperature in the range of 90°–130° C. where the saccharide is a pentose; 120°–150° C. where the saccharide is selected from the group consisting of hexoses and reducing polysaccharides; and 140°–170° C. where the saccharide is a non-reducing polysaccharide which is a precursor of a reducing saccharide.

9. A process for producing an artificial chocolate flavor which comprises reacting a saccharide with glycylalanine by the application of heat to a mixture of the reagents at an elevated temperature and for a time sufficient to produce said artificial chocolate flavor in a substantially anhydrous condition, said flavor producing reaction being carried out at a temperature in the range of 90°–130° C. where the saccharide is a pentose; 120°–150° where the saccharide is selected from the group consisting of hexoses and reducing polysaccharides; and 140°–170° C. where the saccharide is a non-reducing polysaccharide which is a precursor of a reducing saccharide.

10. A process for producing an artificial chocolate flavor which comprises reacting a saccharide with glycyl-alpha-amino-n-butyric acid by the application of heat to a mixture of the reagents at an elevated temperature and for a time sufficient to produce said artificial chocolate flavor in a substantially anhydrous condition, said flavor producing reaction being carried out at a temperature in the range of 90°–130° C. where the saccharide is a pentose; 120°–150° C. where the saccharide is selected from the group consisting of hexoses and reducing polysaccharides; and 140°–170° C. where the saccharide is a non-reducing poly-saccharide which is a precursor of a reducing saccharide.

11. A process for producing an artificial chocolate flavor which comprises reacting a saccharide with glycyl-valine by the application of heat to a mixture of the reagents at an elevated temperature and for a time sufficient to produce said artificial chocolate flavor in a substantially anhydrous condition, said flavor producing reaction being carried out at a temperature in the range of 90°–130° C. where the saccharide is a pentose; 120°–150° C. where the saccharide is selected from the group consisting of hexoses and reducing polysaccharides; and 140°–170° C. where the saccharide is a non-reducing polysaccharide which is a precursor of a reducing saccharide.

12. A process for producing an artificial chocolate flavor which comprises reacting a saccharide with glycyl-leucine by the application of heat to a mixture of the reagents at an elevated temperature and for a time sufficient to produce said artificial chocolate flavor in a substantially anhydrous condition, said flavor producing reaction being carried out at a temperature in the range of 90°–130° C. where the saccharide is a pentose; 120°–150° C. where the saccharide is selected from the group consisting of hexoses and reducing polysaccharides; and 140°–170° C. where the saccharide is a non-reducing poly-saccharide which is a precursor of a reducing saccharide.

References Cited in the file of this patent

UNITED STATES PATENTS

| 2,103,495 | Ruckdeschel | Dec. 28, 1937 |
| 2,179,203 | Stein | Nov. 7, 1939 |

FOREIGN PATENTS

| 107,367 | Great Britain | Mar. 18, 1918 |